US008521444B2

(12) United States Patent
Banerjee et al.

(10) Patent No.: US 8,521,444 B2
(45) Date of Patent: Aug. 27, 2013

(54) METHOD AND APPARATUS FOR ESTIMATING DAMAGE IN A STRUCTURE

(75) Inventors: Sourav Banerjee, Santa Clara, CA (US); Xinlin Qing, Cupertino, CA (US); Shawn J. Beard, Livermore, CA (US); Fu-Kuo Chang, Stanford, CA (US)

(73) Assignee: Acellent Technologies, Inc., Sunnyvale, CA (US)

( * ) Notice: Subject to any disclaimer, the term of this patent is extended or adjusted under 35 U.S.C. 154(b) by 306 days.

(21) Appl. No.: 12/856,511

(22) Filed: Aug. 13, 2010

(65) Prior Publication Data

US 2011/0040496 A1 Feb. 17, 2011

Related U.S. Application Data

(60) Provisional application No. 61/233,777, filed on Aug. 13, 2009.

(51) Int. Cl.
*G01B 3/44* (2006.01)
(52) U.S. Cl.
USPC ................................ 702/34; 702/35; 702/42
(58) Field of Classification Search
USPC ............................. 702/34, 35, 42, 56, 81, 182
See application file for complete search history.

(56) References Cited

U.S. PATENT DOCUMENTS

| 5,852,793 | A | * | 12/1998 | Board et al. ..................... 702/56 |
| 6,370,964 | B1 | * | 4/2002 | Chang et al. ............. 73/862.046 |
| 7,327,962 | B2 | * | 2/2008 | Shoji et al. ........................ 399/9 |
| 7,505,852 | B2 | * | 3/2009 | Board ............................. 702/33 |
| 2008/0183425 | A1 | * | 7/2008 | Hines ............................. 702/182 |
| 2008/0255771 | A1 | * | 10/2008 | Beard ............................. 702/34 |

OTHER PUBLICATIONS

Krishnan Nair Kesavan, Damage diagnosis algorithms for wireless structural health monitoring, 2007.*
K. Krishnan Nair, A comparison of local damage detection algorithms based on statistical signal processing of vibration measurements, Taylor & Francis Group, 2006.*

* cited by examiner

*Primary Examiner* — Sujoy Kundu
*Assistant Examiner* — Harun Chowdhury
(74) *Attorney, Agent, or Firm* — Innovation Counsel LLP (57) ABSTRACT

Detecting damage in a structure without comparing sensor signals to a baseline signal. Once a structure is interrogated, a process based on a Gaussian Mixture Model is applied to the resulting data set, resulting in quantities for which Mahalanobis distances and Euclidian distances can be determined. A damage index is then determined based on the calculated Euclidian distance. A high value of this damage index coupled with an abrupt change in Mahalanobis distance has been found to be a reliable indicator of damage. Other embodiments may employ a baseline, but determine damage according to ratios of energy values between current and baseline signals.

16 Claims, 8 Drawing Sheets

METHOD AND APPARATUS FOR ESTIMATING DAMAGE IN A STRUCTURE

CROSS-REFERENCE TO RELATED APPLICATION

This application claims the benefit of U.S. Provisional Patent Application Ser. No. 61/233,777, entitled "STATISTICAL DAMAGE ESTIMATION AT HOT SPOTS USING GAUSSIAN MIXTURE MODEL," filed on Aug. 13, 2009, which is hereby incorporated by reference in its entirety.

BRIEF DESCRIPTION OF THE INVENTION

This invention relates generally to structural health monitoring. More specifically, this invention relates to methods and apparatuses for estimation of damage in structures.

BACKGROUND OF THE INVENTION

The diagnostics and monitoring of structures, such as that carried out in the structural health monitoring field, are often accomplished by employing arrays of sensing elements coupled to a structure. These sensing elements then either passively monitor the structure for the presence of stress waves propagating therein, or actively interrogate the structure by generating such stress waves, where the stress waves have predetermined waveforms and amplitudes.

While these approaches can be effective in detecting damage, they also have their limitations. For example, damage detection is usually accomplished by comparing signals from the sensing elements with stored baseline waveforms indicative of some previous, or baseline, state of the structure. Difference between the baseline waveforms and the newer signals indicate that the structure has changed between the time of the baseline waveform and the time of the newer signals. However, this approach typically requires one to compensate for changes in the structure or environment that may be benign, yet also result in changes from the baseline waveform. For instance, temperature changes, differences in mechanical loading, or other conditions such as different external lubrication, scrap materials or debris, etc. can all potentially affect the sensor signals. Accounting for these and other effects can be difficult and unreliable, when it can be done at all.

SUMMARY OF THE INVENTION

The invention can be implemented in a number of ways, including as various methods of detecting damage in a structure.

In one embodiment, a method of detecting damage in a structure comprises, for a structural health monitoring system having sensing elements coupled to a structure, collecting data from the sensing elements, the data corresponding to stress waves in the structure and detected by the sensing elements. The method then includes determining an estimate for a density function at least partially according to the collected data from the sensing elements, determining an estimate for an expectation maximization parameter (E) from the estimate for the density function, and revising the estimate for the density function at least partially according to E. The method then repeats, in order, the determining an estimate for a density function, the determining an estimate for an expectation maximization parameter, and the revising so as to determine a converged estimate for the density function. Previous data corresponding to previous stress waves propagated through the structure is then received. Next, a Mahalanobis distance from the converged estimate for the density function and the previous data is determined, as well as a Euclidian distance from the converged estimate for the density function and the previous data. A damage index (DI) is determined from the determined Euclidian distance and a maximum determined value of the Euclidian distance. The presence of a damage in the structure is determined at least partially according to DI and the determined Mahalanobis distance.

In another embodiment, a method of detecting damage in a structure comprises, for a structural health monitoring system having sensing elements coupled to a structure, collecting data from the sensing elements, the data corresponding to stress waves in the structure and detected by the sensing elements. A mean of a density function of a Gaussian Mixture Model is determined at least partially according to the collected data from the sensing elements, wherein the mean is a first mean value. A second mean value of the density function of the Gaussian Mixture Model is received, and a Mahalanobis distance between the first mean value and the second mean value is determined, along with a Euclidian distance between the first mean value and a third mean value of the density function of the Gaussian Mixture Model. A damage index (DI) is determined from the determined Euclidian distance and a maximum determined value of the Euclidian distance, and the presence of a damage in the structure is determined at least partially according to DI and the determined Mahalanobis distance.

In yet another embodiment, a method of detecting damage in a structure comprises, for a structural health monitoring system having sensing elements coupled to a structure, collecting data from the sensing elements, the data corresponding to stress waves in the structure and detected by the sensing elements. Energies of the stress waves are determined from the collected data, and the energies of the stress waves are compared to previously determined energies. From the comparing, those energies of the stress waves that exceed the corresponding previously determined energies are determined, and a damage progression parameter is determined at least partially according to those energies of the stress waves that exceed the corresponding previously determined energies.

Other aspects and advantages of the invention will become apparent from the following detailed description taken in conjunction with the accompanying drawings which illustrate, by way of example, the principles of the invention.

BRIEF DESCRIPTION OF THE DRAWINGS

For a better understanding of the invention, reference should be made to the following detailed description taken in conjunction with the accompanying drawings, in which.

Like reference numerals refer to corresponding parts throughout the drawings.

DETAILED DESCRIPTION OF EMBODIMENTS OF THE INVENTION

In one embodiment, the invention relates to a method of detecting damage in a structure without comparing sensor signals to a baseline signal. Once a structure is interrogated, a process based on a Gaussian Mixture Model is applied to the resulting data set, resulting in quantities for which Mahalanobis distances and Euclidian distances can be determined. A damage index is then determined based on the calculated Euclidian distance. A high value of this damage index coupled with an abrupt change in Mahalanobis distance has been found to be a reliable indicator of damage.

As the Mahalanobis and Euclidian distances are based on collected data sets from the sensing elements, with no baseline signal involved, damage can be determined simply from sensor data, without comparison to any stored baseline signals. This allows for the detection of damage without the need to compensate for various effects such as variations in operational loading or environmental changes.

As above, damage is detected by analysis of signals from sensing elements placed on, or in mechanical communication with, a structure. Typically, a network of sensor/actuators is affixed to a structure, with certain sensors from the sensor network transmitting diagnostic stress waves through the structure in known fashion. Other (or perhaps the same) sensors of the sensor network detect these stress waves after they have propagated through the structure some distance, and transmit corresponding signals to an analyzer for determination of whether these signals indicate the presence of damage.

Figure 1A:
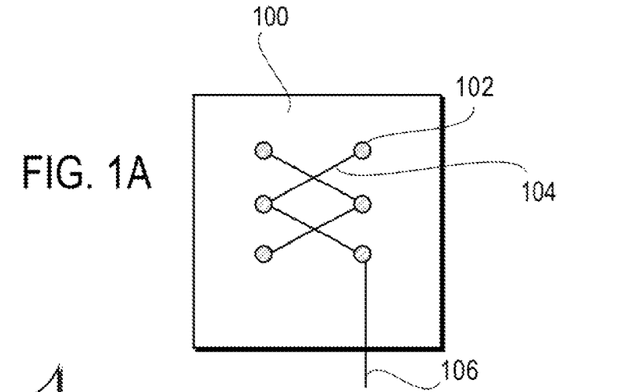
FIG. 1A illustrates a top view of a sensing layer manufactured in accordance with embodiments of the present invention.

For ease of installation, the sensor network can be placed on a flexible dielectric substrate to form a diagnostic layer. FIG. 1A illustrates such a flexible diagnostic layer for use in accordance with embodiments of the present invention. A diagnostic layer 100 is shown, which contains an array of transducers 102. As above, the transducers 102 can act as sensors capable of receiving signals used in structural health monitoring such as stress waves, and also as actuators capable of generating vibration, and are connected to conductive traces 104. The traces 104 connect (or interconnect, if necessary) transducers 102 to one or more output leads 106 configured for connection to a processor or other device capable of analyzing the data derived from the sensors 102. Accordingly, the transducers 102 can both passively generate electrical signals in response to stress waves, and actively transmit stress waves when a voltage is applied to them.

The diagnostic layer 100 and its operation are further described in U.S. Pat. No. 6,370,964 to Chang et al., which is hereby incorporated by reference in its entirety and for all purposes. Construction of the diagnostic layer 100 is also explained in U.S. Pat. No. 7,413,919, filed on Jun. 21, 2004, which is also incorporated by reference in its entirety and for all purposes. It should be noted that the present invention is not limited to the embodiments disclosed in the aforementioned U.S. Pat. No. 7,413,919. Rather, any network of sensors and actuators can be employed, regardless of whether they are incorporated into a flexible substrate or not. The invention simply contemplates sensors and actuators that are attached to structures in any manner that allows for analysis according to the methods described herein. One of skill will realize that many different approaches exist for attaching sensors and actuators to a structure, not all of which employ flexible substrates. Accordingly, the diagnostic layers illustrated herein are used for purposes of convenience only, and sensor networks that do not employ layers can be employed as well.

Figure 1B:
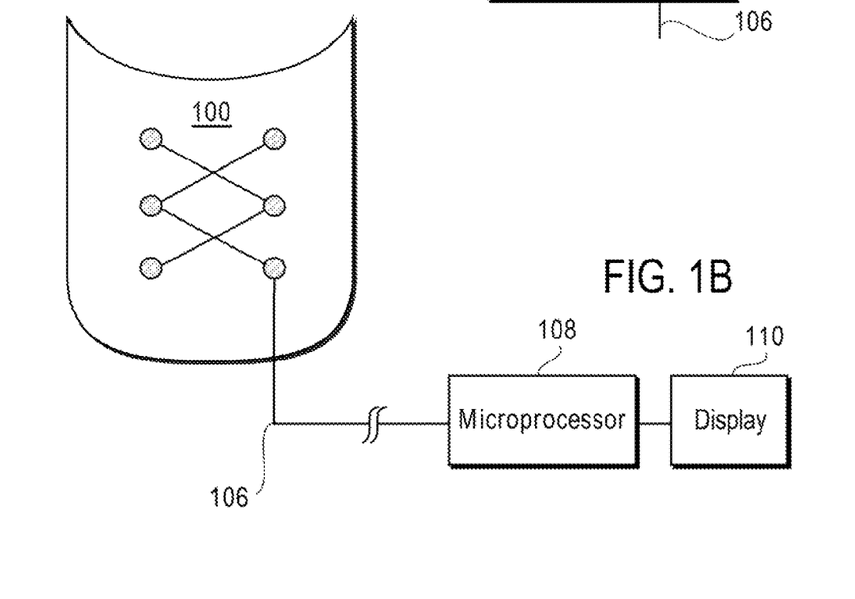
FIGS. 1B-1C illustrate block and circuit diagrams, respectively, describing elements of a sensing layer and their operation.

FIG. 1B further describes aspects of the operation of the diagnostic layer 100. In operation, the output leads 106 are electrically connected to an analysis unit such as a microprocessor 108, suitable for analyzing signals from the sensors 102. In certain embodiments, the flexible layer 100 is first attached to a structure in a manner that allows the sensing elements 102 to detect quantities related to the health of the structure. For instance, the sensors 102 can be sensors configured to detect stress waves propagated within the structure, and emit electrical signals accordingly. The microprocessor 108 then analyzes these electrical signals to assess whether damage has occurred. Quantities such as these can then be displayed to the user via display 110.

Figure 1C:
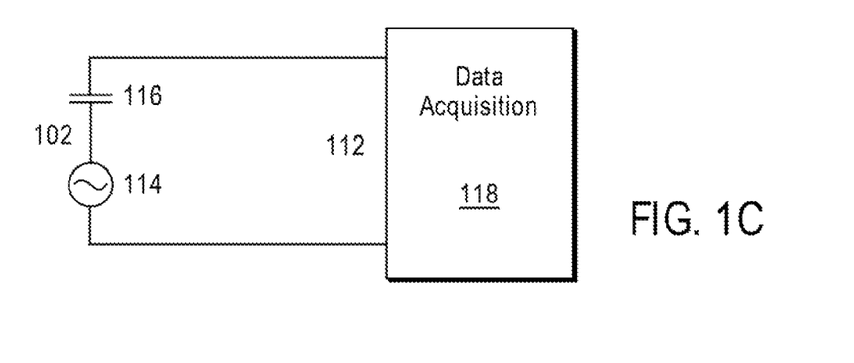

In one embodiment, the sensors 102 can be piezoelectric transducers capable of reacting to a propagating stress wave by generating a voltage signal. Analysis of these signals highlights properties of the stress wave, such as its magnitude, propagation speed, frequency components, and the like. Such properties are known to be useful in structural health monitoring. FIG. 1C illustrates a circuit diagram representation of such an embodiment. This embodiment can often be represented as a circuit 112, where each sensor 102 is represented as a voltage source 114 in series with a capacitor 116 (impedance circuitry) used to adjust signal strength. This pair is in electrical contact with a data acquisition unit 118, such as a known data acquisition card employed by microprocessors 108 (the data acquisition unit 118 can be thought of as a component interface to the microprocessor 108). Propagating stress waves induce the sensor 102 to emit a voltage signal that is recorded by the data acquisition unit 118, where it can be analyzed to determine the health of the structure in question. As discussed below, these piezoelectric transducers can also act as actuators, converting an applied voltage to a stress wave signal. In another embodiment, the sensors 102 can be known fiber optic sensors that convert stress waves to optical signals.

Figure 2A:
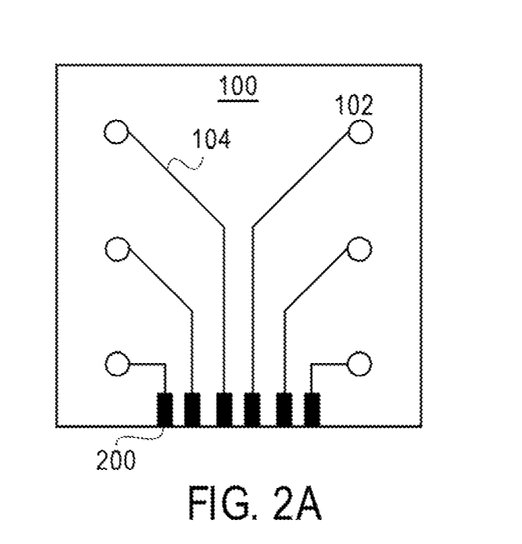
FIG. 2A illustrates a top view highlighting further details of a sensing layer having a two-dimensional array of sensors.
Figure 2B:
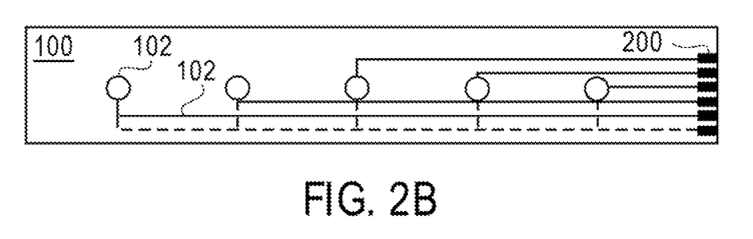
FIG. 2B illustrates a top view highlighting further details of a sensing layer having a one-dimensional array of sensors.

FIG. 2A illustrates further details of a sensing layer 100. It should be noted that the invention includes sensing layers 100 configured in any number of ways. For instance, the sensors 102 can be distributed in any manner throughout the layer 100. Here, six such sensors 102 are shown regularly distributed in a two-dimensional array, each with a single trace 104 extending to the contacts 200. However, one of skill will observe that the sensors 102, traces 104, and contacts 200 can be distributed in any manner, and in any number, without departing from the scope of the invention. For example, the sensors 102 can also be configured in a one-dimensional array such as that shown in FIG. 2B. Here, instead of two rows of sensors 102, a single row is employed. Such a one-dimensional array finds uses in, for example, the monitoring of areas too narrow to fit a two-dimensional array.

Figure 3:
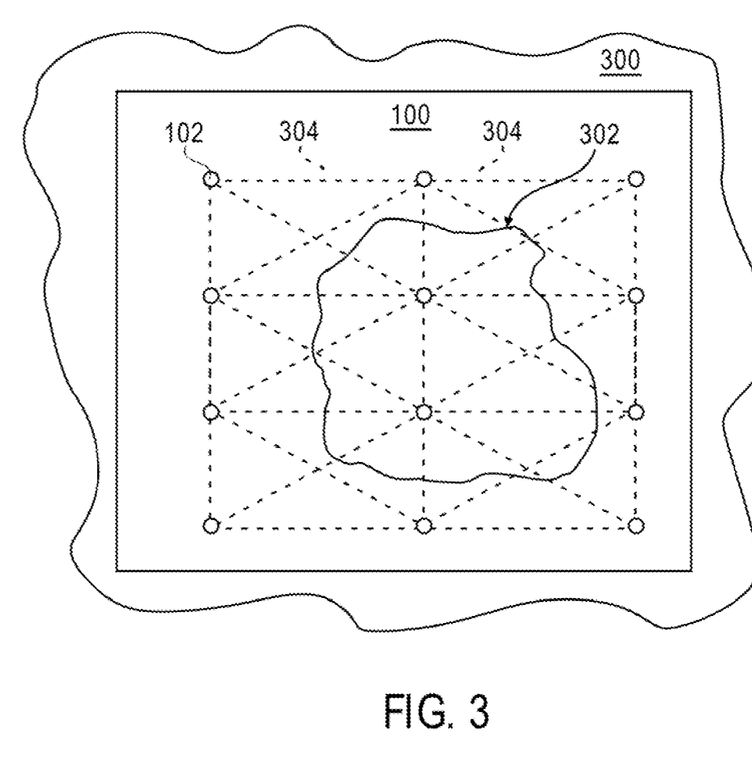
FIG. 3 illustrates a sensing layer and sensors/actuators configured to analyze a damage region of a structure in accordance with embodiments of the present invention.

FIG. 3 illustrates a diagnostic layer 100 and sensors/actuators configured to analyze a damage region of a structure in accordance with embodiments of the present invention. The diagnostic layer 100 is attached to a structure 300, allowing it to detect and analyze damage regions 302 via transducers 102 that can be either passive sensors or actuators. In operation of the system of FIG. 1B, stress waves are sent out by various ones of the sensors/actuators 102. Those stress waves sent along paths 304 that do not intersect the damage region 302 will remain unchanged, while those stress waves sent along paths 304 that do intersect the damage region 302 will be altered. In particular, passing through the damage region 302 typically alters the stress waves in such a manner that their energy is reduced. This reduction in energy can, if detected and analyzed correctly, be employed as an indicator of damage.

Figure 4:
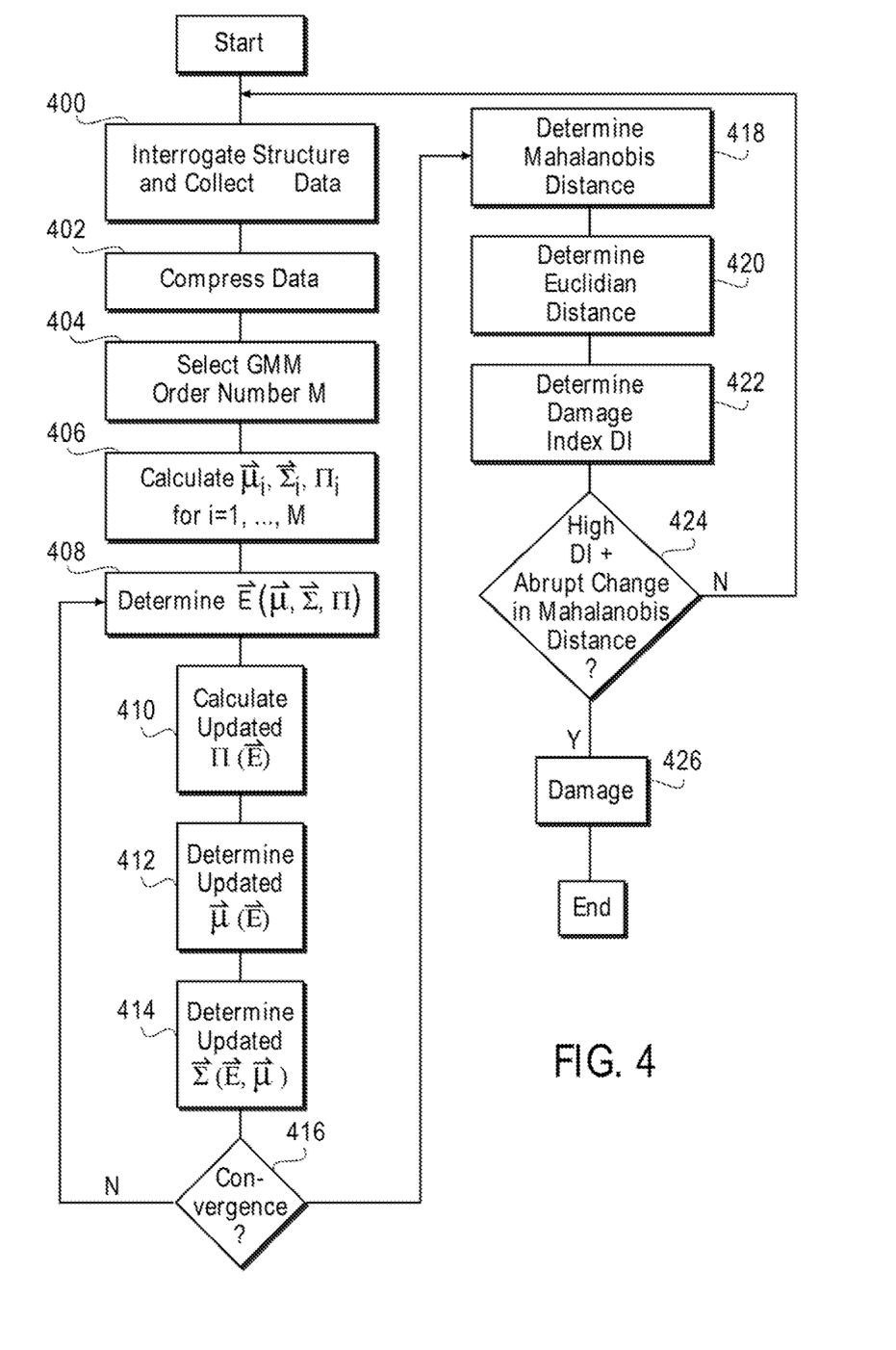
FIG. 4 illustrates an exemplary process for detecting damage according to embodiments of the present invention.

FIG. 4 illustrates an exemplary process for detecting damage according to embodiments of the present invention. First, the transducers 102 interrogate, or scan, the structure by transmitting stress waves through the structure (Step 400). Any suitable waveforms may be used in this scan. The stress waves propagate along paths 304, where they are detected by other sensing elements 102. These sensing elements 102 generate electrical signals corresponding to their received stress waves, and transmit these signals to processor 108. The signals may be pre-processed prior to reception by processor 108. For example, the signals may be conditioned, filtered, and digitized as desired.

The resulting signals may then be transmitted to processor 108 as sensor data, whereupon the data are collected, compressed, and arranged as a vector X (Step 402). While compression is not strictly required and embodiments of the invention contemplate analysis of the complete set of sensor data, compression of this data set speeds the analysis, and is thus often desirable. Any suitable compression method is contemplated, however the following approach has been found to be effective. First, the signal x(t) corresponding to the stress waves transmitted by an a-th actuator and received at a b-th sensor can be normalized by the following equation $$X_{ab}(t) = \frac{x_{ab}(t) - \mu_{ab}}{\sigma_{ab}} \quad (1)$$

where, $\mu_{ab}$ and $\sigma_{ab}$ are the mean and standard deviation, respectively, of signal x(t).

This normalized signal is then divided into N segments, where the k-th segment can be denoted by $X_{ab}^k(t)$. The energy of each of the N segments is then calculated according to $$X_{ab}^k(t) = \sum_{n=\alpha}^{n=\beta} \text{abs}(x_{ab}(n))^2 \quad (2)$$

Where, $\alpha = (k-1)\frac{n}{N} + 1$ and $\beta = \left[(k-1)\frac{n}{N} + 1 + \frac{n}{N}\right]$ and a Discrete Time Model (DTM) approach is then applied. In this DTM approach, the energy content of each respective segment is determined, so that each signal x(t) is effectively compressed into a vector of N energy values. For better resolution, N can be increased. Often multiple sets of sensor data are analyzed. For example, multiple sensor paths are scanned, at multiple different frequencies. Each set of data (i.e., data taken from each sensor path, and at each frequency) is compressed as above and assembled into a vector of N values, and these vectors are then assembled into a matrix X. More specifically, for S different sets of data, X becomes an N×S matrix of S N×1 vectors of energy values.

The normalized signals can be compressed by any approach, and the invention is not limited to use of DTM. For example, the signals can be compressed according to other known approaches, such as Auto Regression (AR). However, DTM is often preferable over AR due to known drawbacks of AR such as computation time, and the need for step by step intervention.

The vector X is then analyzed according to an approach based on a Gaussian Mixture Model (GMM), which is a type of unsupervised learning technique that employs a Gaussian Bayes classifier, and which appears not to have previously been applied to structural health monitoring problems. A GMM of order number M can be written as follows $$\Phi(x_{1:N}) = \sum_{i=1}^{M} \pi_i \phi_i(X; \Theta_i) \quad (3)$$

where X is the vector of compressed data from DTM (or alternate approach, such as AR). M is the order of the GMM, which contains M classes. The function is a density function, and can be approximated as $\phi_i \approx \text{NormalDistribution}(\mu_i, \Sigma_i)$, i.e. a Gaussian vector with mean $\mu_i$, covariance $\Sigma_i$. $\pi_i$ is the mixture weight of the i-th class.

The order number M is then selected (Step 404). The order number M can be determined in any manner. However, it has been found that M=4 and M=6 have resulted in relatively effective damage determination. While a physical basis for a certain value of M may or may not always exist, it may in some applications be desirable to set M equal to the expected number of wave packets (i.e., wave modes and their reflections) received at a typical sensing element. Thus, if the interrogating stress waves has two modes and it is expected that two reflections will also be received, a sensor will receive 6 total modes (the two modes of the interrogating stress wave, and two reflections for each of these modes), hence M=6.

Initial guesses for $\mu_i$, $\Sigma_i$, and $\pi_i$ are then calculated (Step 406). The invention contemplates any approach for determining initial guesses for $\mu_i$, $\Sigma_i$, and $\pi_i$. However, a K-means method has been found to be one suitable approach. K-means processes are known, and further explanation of this approach can be found in Hastie et al., 2001, ELEMENTS OF STATISTICAL LEARNING: DATA MINING, INTERFACE AND PREDICTION, 1$^{st}$ edition (2001), which is hereby incorporated by reference in its entirety.

Once initial values for $\mu_i$, $\Sigma_i$, and $\pi_i$ are determined, N×N matrix E is calculated (Step 408) as follows $$E(I_{ij}) = \frac{p(X_i \mid I_{ij} = 1)\pi_j}{\sum_{k=1}^{M} p(X_i \mid I_{ik} = 1)\pi_k} \quad \text{where} \quad (4)$$

$$p(X_i \mid I_{ij}) = \frac{1}{(2\pi)^{D/2}} |\Sigma_j|^{-1/2} \exp\left[-\frac{1}{2}(X_i - \mu_j)^T \Sigma_j^{-1}(X_i - \mu_j)\right];$$

$$i = 1, \ldots, M; \quad j = 1, \ldots,$$

M; and D is the row dimension of the data set, i.e. the number of data sets analyzed. E is a matrix of expectation maximization parameters, which are useful in determining $\mu_i$, $\Sigma_i$, and $\pi_i$.

Updated values for $\pi_i$ are then determined (Step 410) according to $$\pi_i = \frac{\sum_{k=1}^{N} E(I_{ki})}{N} \quad (5)$$

where N is the column dimension of the data set or, as above, the number of compressed energy values from each data set. The mean and covariance matrices are then updated (Steps 412, 414) as follows $$\mu_i = \frac{\sum_{k=1}^{N} E(I_{ki})X_k}{\sum_{k=1}^{N} E(I_{ki})} \text{ and } \Sigma_i = \frac{\sum_{k=1}^{N} E(I_{ki})(X_k - \mu_i)(X_k - \mu_i)^T}{\sum_{k=1}^{N} E(I_{ki})} \quad (6)$$

After calculation of the updated mean, covariance and weight parameter, a test is applied to determine whether $\mu_i$, $\Sigma_i$, and $\pi_i$ have converged to stable values (Step 416). Convergence is determined according to any suitable approach or criterion. One approach that has been determined to be effective employs a log likelihood function, which can be written as $$\left| \frac{\log T_{(step+1)}}{\log T_{step}} \right| - 1 < \varepsilon = 0.001 \quad (7)$$

$$T(X; \mu, \Sigma, \pi) = \log \left\{ \prod_{i=1}^{N} \prod_{j=1}^{M} [p(X_i | I_{ij} = 1)p(I_{ij} = 1)]^{I_{ij}} \right\}$$

$$\text{where } = \sum_{i=1}^{N} \sum_{j=1}^{M} I_{ij}[\log\{p(X_i | I_{ij} = 1)\} + \log \pi_j]$$

If equation (7) is not satisfied, the process returns to Step 408. On the other hand, when $\mu_i$, $\Sigma_i$, and $\pi_i$ have converged to the point where they satisfy equation (7), they are used to determine the presence of damage. More specifically, the converged vectors $\mu$, $\Sigma$, and $\pi$ are used to calculate Mahalanobis distances (Step 418) and Euclidian distances (Step 420).

In Step 418, Mahalanobis distances can be measured in at least two ways. The first approach, called a Fixed Reference approach, determines a Mahalanobis distance between the most recent set of sensor data and the first set of sensor data. The second approach, called a Moving Reference approach, determines Mahalanobis distance between the most recent set of sensor data and the next-most-recent set of sensor data. Mahalanobis distances for these approaches can be determined, respectively, by $$M_j = \prod_{m=1}^{M} \sqrt{(\mu_j^m - \mu_{j+1}^m)\Sigma_1^{-1}(\mu_j^m - \mu_{j+1}^m)^T} \quad (8, 9)$$

$$M_j = \prod_{m=1}^{M} \sqrt{(\mu_j^m - \mu_{j+1}^m)\Sigma_j^{-1}(\mu_j^m - \mu_{j+1}^m)^T}$$

where the subscript j+1 represents the current data set, and the subscript 1 represents the first data set collected.

These Mahalanobis distances are used to correlate with Euclidian distances as a check to determine whether the Damage Index (DI) is above average value. If all checks are confirmed damage event can be confirmed. The Euclidian distance can be calculated (Step 420) as follows $$E_j = \sum_{m=1}^{M} \frac{1}{((\mu_j^1 - \mu_j^m)^2 * (\mu_j^1 - \mu_j^m)^{2T})} \quad (10)$$

where M is the number of classes, or order of the GMM.

A damage index DI is then determined from the calculated Euclidian distances (Step 422). The damage index associated with the j-th set of sensor data is $$DI_j = E_j/\max(E_j) \quad (11)$$

A check is then made to determine first whether the DI value is high, and second whether this high DI value is confirmed by a relatively or generally abrupt change in Mahalanobis distance (Step 424). If both these conditions are present, the system can generate an alarm or otherwise indicate the presence of damage (Step 426). Otherwise, the process can return to step 400 and interrogate the structure again at an appropriate time.

The determination of whether a high DI value is present, and whether a Mahalanobis distance has changed abruptly, can be made in any manner. For example, a predetermined threshold value of DI may be set, and if DI exceeds this value, the first condition of Step 424 may be considered to be satisfied. Similarly, a predetermined percentage change in Mahalanobis distance may be set, and if the difference between $M_j$ and $M_{j-1}$ exceeds this predetermined percentage change, the second condition of Step 424 may be considered to be satisfied. In one application, it has been found that a threshold value for DI of 0.3 and a percentage change for Mahalanobis distance of 200% (i.e. twice the calculated threshold value from the previous 7 data sets) resulted in sufficiently accurate damage determination.

In another application, the first several data sets acquired (e.g., the first 30% or so of the total number of expected data sets) are averaged to determine the "threshold value" used to determine whether Mahalanobis distance has changed or not. For instance, say 30 data sets exist (or will exist). The first 9 data sets or so can be averaged to determine this threshold value. More specifically, the Mahalanobis distance and Euclidian distance for each of these 9 data sets can be represented as M(i) and E(i) (where i takes values from 1 to 9), respectively. As a next step, the mean and standard deviation of the M and E values are then calculated. That is, the mean and standard deviation Mm, Ms of the 9 M(i) values is determined, as is the mean and standard deviation Em, Es of the 9 E(i) values. Then, a Mahalanobis Threshold (MT) and Euclidian Threshold (ET) are set as per the following $$MT = 2(Mm+2Ms) \text{ and } ET = Em+Es \quad (12)$$

If the calculated Mahalanobis distance and Euclidian distance for one data set exceeds both MT and ET respectively, then damage is detected.

However, it should be noted that the invention is not limited to these threshold values or percentage changes. Rather, the invention contemplates any way of deciding whether values of DI are high, and any approach for determining whether Mahalanobis distance has changed abruptly.

As can be seen, the above process determines the presence of damage according to vectors $\mu$, $\Sigma$, and $\pi$ that are calculated from sensor data, without need for a stored baseline signal. That is, damage is determined according to changes in the sensor data over time, rather than changes in sensor data from baseline signals that may have been taken (or otherwise determined) so long ago that they are no longer relevant. The determination of data according to recent changes in sensor data thus allows for accurate determination of damage even when the structure in question changes over time. This both improves accuracy and eliminates the need to periodically revise baseline signals.

Figure 5:
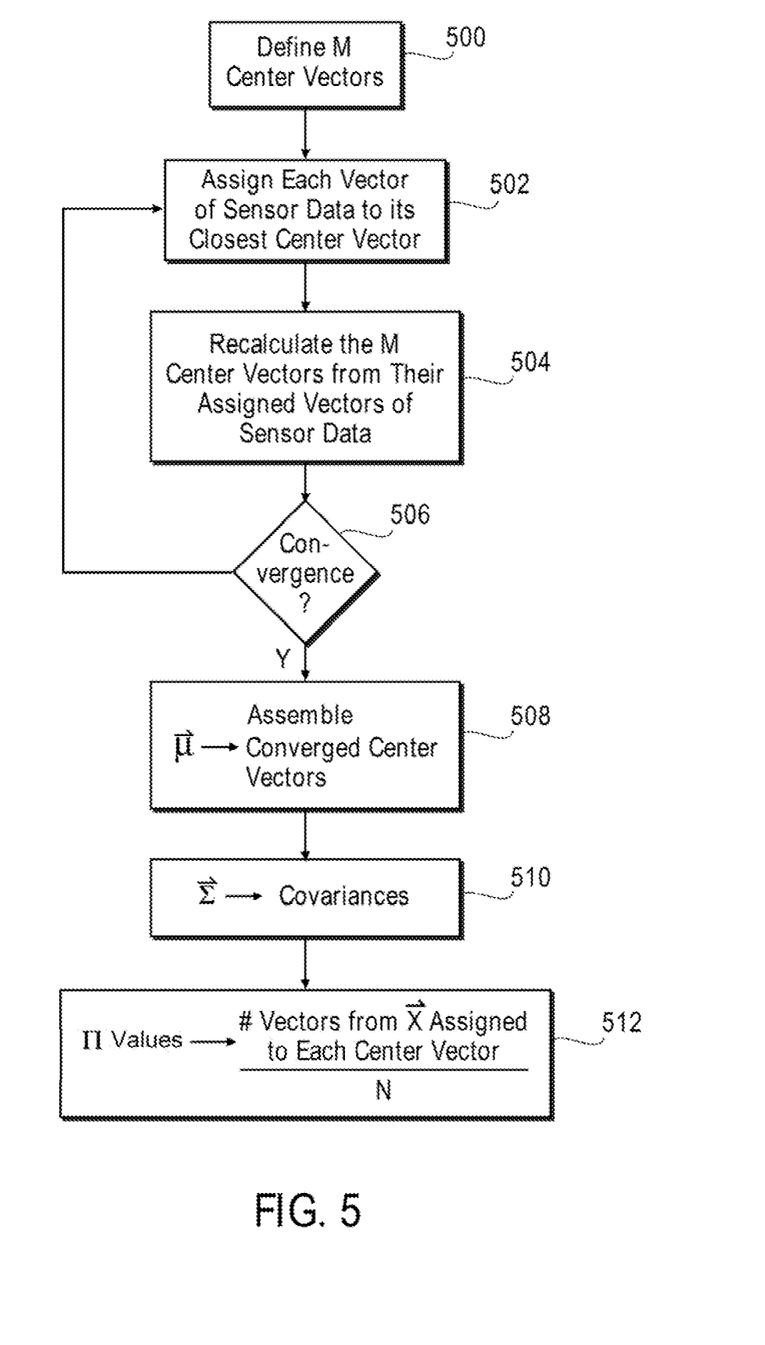
FIG. 5 illustrates further details of one embodiment of Step 406 of FIG. 4.

Attention now turns to further details of Step 406, and determination of initial guesses for $\mu_i$, $\Sigma_i$, and $\pi_i$ according to a K-means-based method. FIG. 5 illustrates further details of one embodiment of Step 406 of FIG. 4. First, M 1×S center vectors are defined (Step 500). Each vector of sensor data is then assigned to its nearest center vector (Step 502). That is, each of the S N×1 vectors of energy values that make up X is individually assigned to its nearest center vector. Each of the M center vectors is then recalculated as the center of its assigned vectors of sensor data (Step 504). If each of the M center vectors has converged to a stable value (Step 506), i.e. if each of the M center vectors no longer moves upon the recalculation of Step 504, then each $\mu_i$ is set equal to its converged center vector (Step 508). If not, then the process returns to Step 502 and repeats until convergence has occurred. Once values of $\mu_i$ have been determined, the covariances $\Sigma_i$ of $\pi_i$ are determined, in known manner (Step 510). Each $\pi$ value is then calculated as the fraction of vectors from X that are assigned to that particular center vector (Step 512). That is, for i=1, . . . , N, $\pi_i$=(number of vectors assigned to $i^{th}$ center vector)/N. The end result of the process of FIG. 5 is converged initial estimates of $\mu_i$, $\Sigma_i$, and $\pi_i$.

Figure 6A:
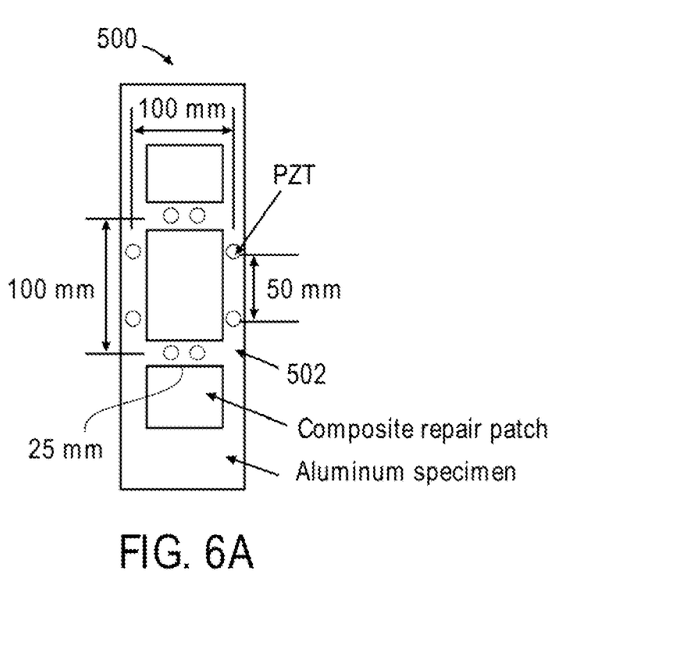
FIG. 6A is an illustration of a test setup used to test damage detection processes of the invention.
Figure 6B:
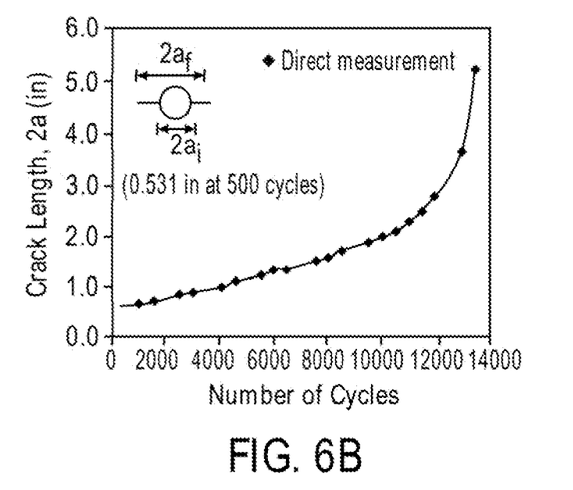
FIG. 6B is a graph of the growth of a crack on the test setup, plotted as a function of the number of fatigue cycles.

The above-described processes have been tested, and the results of these tests are now described in connection with FIGS. 6A-C. FIG. 6A is an illustration of a test setup used to test damage detection processes of the invention. This test setup was used to detect crack growth under a bonded composite repair during fatigue cycling. The test structure 500, or coupon specimen, was made of 4.8 mm thick aluminum plate with the specific geometry shown. The specimen was fabricated with a 6.35 mm diameter through hole in its center, and with 2.5 mm EDM (electrical discharge machining) notches on each side of the hole that form the crack to be measured. A square sensor layer 502 with eight piezoelectric elements was designed for the coupon specimen. This diagnostic layer 502 was bonded onto the specimen using quick-cure epoxy, which allowed for quick and easy installation. The maximum amplitude of the actuator input was ±5 V. Data was collected from the sensors at different load levels. The load was cycled in tension between 4.5 and 120 kN at 5 Hz, and data was collected at intervals of 500 cycles, i.e. one set of sensor data was collected every 500 cycles. A total of 27 data sets were collected. FIG. 6B is a plot of crack growth measured as a function of the number of fatigue cycles.

Figure 6C:
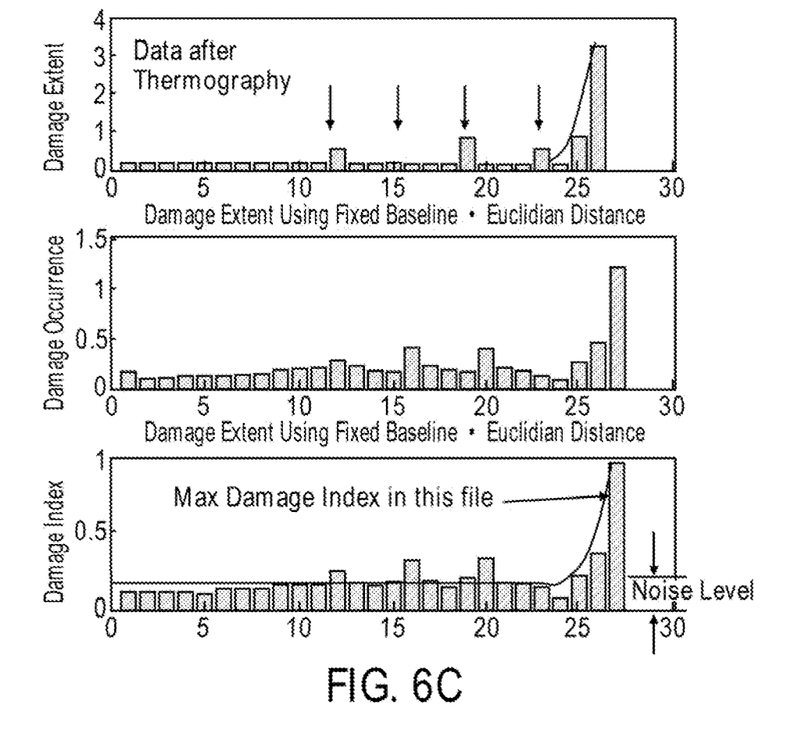
FIG. 6C is a graph of test results from the test setup of FIG. 6A, demonstrating damage detection according to processes of the invention.

FIG. 6C is a set of graphs of Mahalanobis and Euclidian distances calculated from the collected data. The GMM order number was chosen as 4, i.e. M=4. Here, the upper graph shows the resulting Moving Reference Mahalanobis distances, the middle graph shows the resulting Fixed Reference Mahalanobis distances, and the lower graph shows the Euclidian distances for the same data. The Moving Reference Mahalanobis distances show spikes in data sets 12, 15, 19, 23, and 25 (i.e. data measurements taken at 6000, 7500, 9500, 11500, and 12500 cycles), where these spikes correspond to thermography that was performed on the specimen after 5000, 7000, 9000, 11,000 and 12,500 fatigue cycles. Thus, the Moving Reference Mahalanobis distances appear to accurately detect changes in the properties of the structure. Also, both Mahalanobis distance as well as the Euclidian distance graphs appear to show significantly worsening damage beginning at approximately data set 25 (12500 fatigue cycles). This finding is confirmed by FIG. 6B, which shows a corresponding significant acceleration in crack length at approximately the same time. The predictive metrics of this embodiment, i.e. Mahalanobis and Euclidian distances, are thus shown to be an accurate predictor of damage.

Figure 6D:
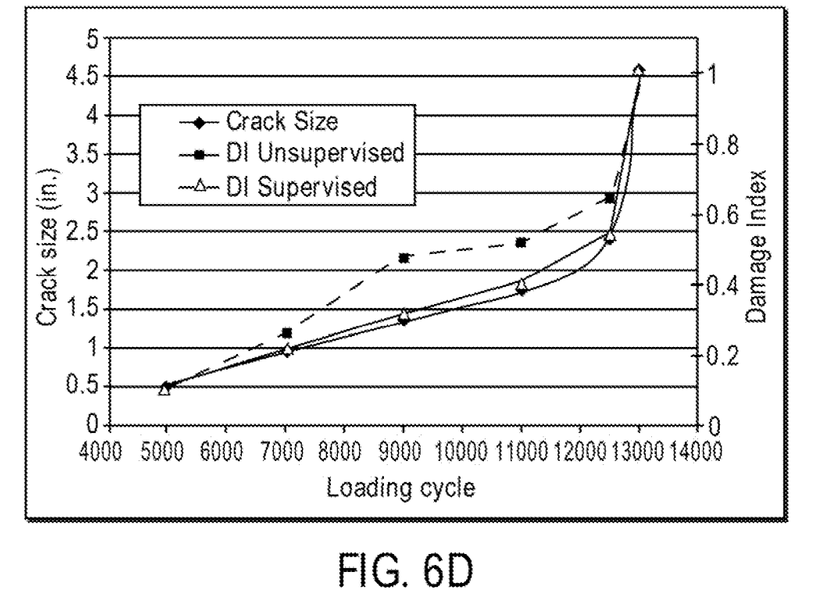
FIG. 6D is a graph of damage indexes of the present invention, as calculated from test results from the test setup of FIG. 6A.

This is further demonstrated in FIG. 6D. Here, the measured crack lengths of FIG. 6B are plotted against "unsupervised DI," or the damage index DI values determined from the Euclidian distances of FIG. 6C, and the "supervised DI," or unsupervised DI values subtracting the spikes in Euclidian distance due to the known thermography events. That is, the Euclidian distance values adjacent to each spike value were averaged, and spike values above this average were subtracted from the unsupervised DI values, resulting in the supervised DI curve. From FIG. 6D, it can be seen that the supervised DI curve is a particularly accurate predictor of crack growth, or damage. The unsupervised DI curve, while being somewhat less accurate of a predictor, still effectively predicts damage. Thus, methods of the invention are shown to accurately predict damage without the need for a predetermined baseline set of data.

Figure 7:
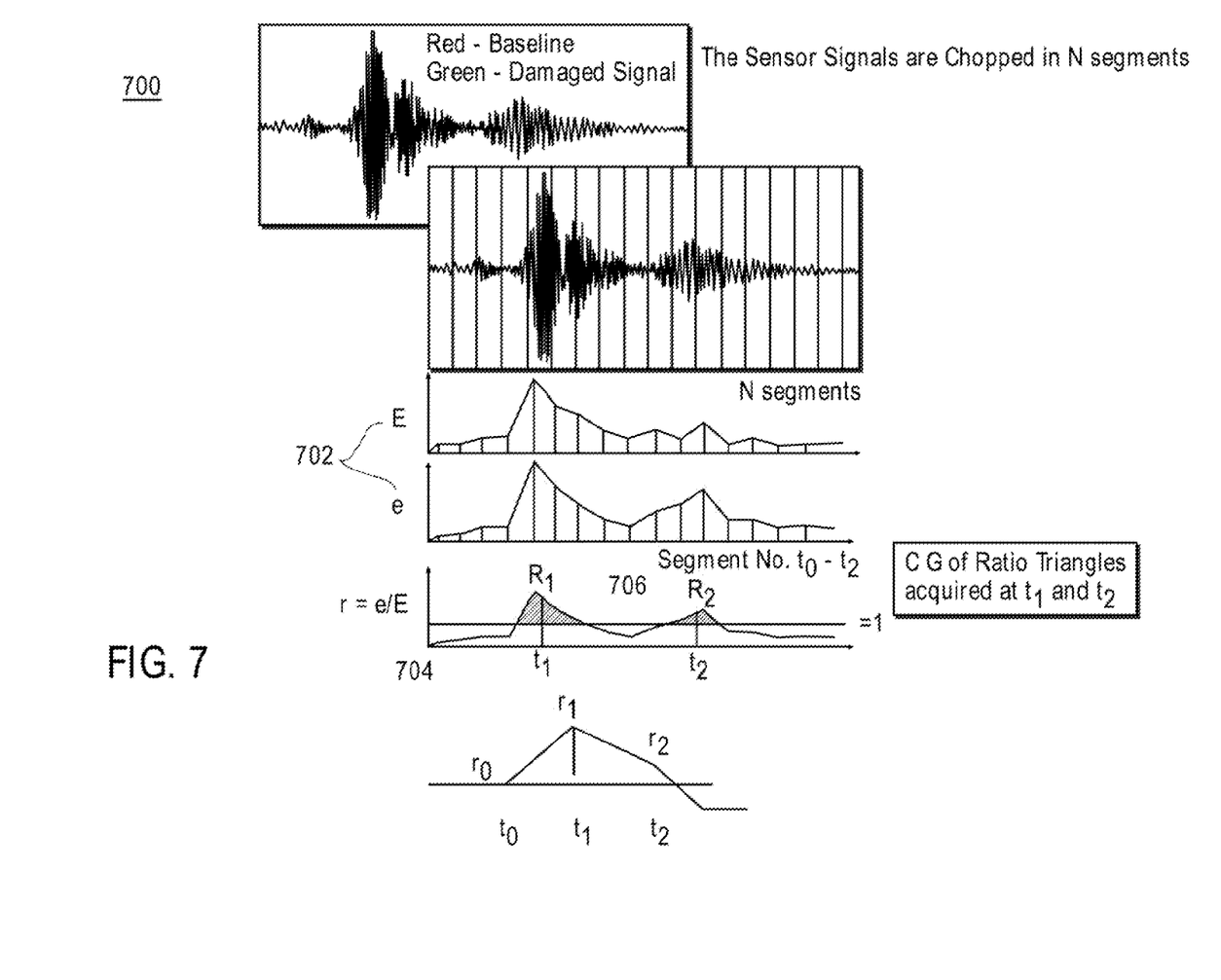
FIG. 7 illustrates an exemplary process for detecting damage according to further embodiments of the present invention.

FIG. 7 graphically illustrates an exemplary process for detecting damage according to further embodiments of the present invention. Here, an alternate process is introduced, which results in determination of a damage progression parameter (DPP). The structure in question can be considered to be damaged if DPP exceeds a predetermined threshold value.

The first three steps in the process of FIG. 7 are similar to the first two steps of the process of FIG. 4. Namely, sensing elements 102 interrogate the structure 300 (Step 700) by generating a predetermined stress wave profile. The stress waves are then received at other sensing elements 102, which generate corresponding electrical signals that are conditioned, filtered, digitized, and compressed (Step 702). As in FIG. 4, compression involves dividing the signals into N segments as shown, and determining the energy e of each segment of the signal. This results in a graph of e as a function of time, as shown in the second from the top graph of FIG. 7. This energy graph e is then compared to a baseline or previously-determined graph of energy values E calculated in a similar manner at some previous time and stored in memory (perhaps in a memory associated with processor 108, not shown).

The point-by-point ratio r=e/E is then plotted (Step 704), and any areas of this plot that are above r=1 are noted. The center of area of each such area is determined, as well as the corresponding time t for each area center (Step 706). For example, in the third graph from the top of FIG. 7, the blacked-out areas above r=1 are denoted R1 and R2, and each has an area center occurring at times $t_1$ and $t_2$, respectively. Although it can be seen that the plot of ratio r in Step 704 may have more than two areas exceeding r=1, in this embodiment, only the first two such areas are considered. In this example, one of ordinary skill in the art will observe that the two areas R1, R2 correspond to the first and second arrival waveforms, which are the only two waveforms considered to be of concern in determining damage by this embodiment.

A damage progression parameter DPP is determined from these areas R (Step 708). More specifically, the DPP η is determined generally according to $$\left(\frac{r_1 - r_0}{t_1 - t_0}\right)\left(\frac{t_2 - t_0}{r_2 - r_1}\right) = \eta \quad (12)$$

where t0 is the time at which the first area R1 first exceeds r=1 and r0 is the value of r at that time (i.e., r0=1), t1 is the time corresponding to the area center of area R1 and r1 is the peak value of r within R1, and t2 is the time corresponding to the area center of R2 and r2 is the peak value of r within R2. These quantities are shown graphically under the graph of r in FIG. 7 (i.e., the bottom-most graph of FIG. 7), where it can be seen that the left parenthetical of equation (12) corresponds to the slope of this graph between times $t_0$ and $t_1$, while the right parenthetical corresponds to the inverse of the fall in magnitude from $r_1$ to $r_2$, plotted over the total time $t_2-t_0$. That is, the left parenthetical is a measure of the rate at which the energy of the first arrival waveform has changed from its baseline, and the right parenthetical is a measure of rate of dispersion or dissipation of that energy e which exceeds the "base" amount of energy E.

The DPP $\eta$ can be plotted over time, and damage can be determined by whether the rate of change of $\eta$ suddenly increases, or at any time exceeds a predetermined threshold value. The invention contemplates any suitable threshold value, or any other criteria for determining damage, such as the rate of change of $\eta$ exceeding a threshold value, or a combination of both the magnitude of $\eta$ and its rate of change.

In cases where r=e/E never exceeds 1, then the steps of this embodiment can proceed using the first two valleys, or low points, in the plot of r, rather than the first two peaks. That is, R1 and R2 can refer to the areas of the first two valleys (i.e., the areas below succeeding peaks), r1 and r2 are the lowest values of r within R1 and R2 respectively, and t1 and t2 are the times corresponding to the area centers of R1 and R2 respectively.

The foregoing description, for purposes of explanation, used specific nomenclature to provide a thorough understanding of the invention. However, it will be apparent to one skilled in the art that the specific details are not required in order to practice the invention. Thus, the foregoing descriptions of specific embodiments of the present invention are presented for purposes of illustration and description. They are not intended to be exhaustive or to limit the invention to the precise forms disclosed. Many modifications and variations are possible in view of the above teachings. For example, sensor signals can be normalized by any approach. Additionally, any GMM order number may be employed, and any approach may be used to estimate initial values for determination of the various parameters of the GMM. Also, the invention contemplates any suitable threshold values for quantities such as the amount of change in Mahalanobis distances, and the values of DI. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method of detecting damage in a structure, comprising:
for a structural health monitoring system having sensing elements coupled to the structure, collecting data from the sensing elements, the data corresponding to stress waves in the structure detected by the sensing elements;
determining an estimate for a density function at least partially according to the data collected from the sensing elements;
determining an estimate for an expectation maximization parameter (E) from the estimate for the density function;
revising the estimate for the density function at least partially according to E;
repeating, in order, the determining an estimate for a density function, the determining an estimate for an expectation maximization parameter, and the revising so as to determine a converged estimate for the density function;
receiving previous data corresponding to previous stress waves propagated through the structure;
determining Mahalanobis distances from the converged estimate for the density function and the previous data;
determining Euclidian distances from the converged estimate for the density function and the previous data;
determining a maximum value of the Euclidian distances;
determining a damage index (DI) based on the Euclidian distances and the maximum value of the Euclidian distances; and
determining the presence of damage in the structure at least partially according to DI and the Mahalanobis distances;
wherein determining the presence of damage in the structure is based on whether DI exceeds a first predetermined threshold value, and whether a change in a Mahalanobis distance from one or more previously determined Mahalanobis distances exceeds a second predetermined threshold value.

2. The method of claim 1, wherein the density function is a density function of a Gaussian Mixture Model.

3. The method of claim 2, wherein the density function comprises a Gaussian distribution having a mean $\mu_i$ and a covariance $\Sigma_i$, and wherein the Gaussian Mixture Model further comprises a mixture weight $\pi_i$.

4. The method of claim 2, wherein the Gaussian Mixture Model further comprises an order number, and the order number is preferably 4 or 6.

5. The method of claim 2, wherein determining the estimate for the density function further comprises determining the mean $\mu_i$, covariance $\Sigma_i$, and mixture weight $\pi_i$ at least partially according to a K-means process.

6. The method of claim 1, wherein:
the converged estimate further comprises a first mean value of the density function; and
determining the Mahalanobis distances further comprises retrieving a second mean value of the density function, and determining a Mahalanobis distance between the first mean value and the second mean value.

7. The method of claim 6, wherein determining the Euclidian distances further comprises determining a Euclidian distance between the first mean value and a third mean value of the density function.

8. The method of claim 7, wherein the third mean value is the second mean value.

9. A method of detecting damage in a structure, comprising:
for a structural health monitoring system having sensing elements coupled to the structure, collecting a plurality of data sets from the sensing elements, the plurality of data sets corresponding to stress waves in the structure detected by the sensing elements;
determining a mean of a density function of a Gaussian Mixture Model for each data set, wherein the mean is a first mean value;
receiving a second mean value of the density function of the Gaussian Mixture Model for each data set;

determining a Mahalanobis distance between the first mean value and the second mean value for each data set;

determining a Euclidian distance between the first mean value and a third mean value of the density function of the Gaussian Mixture Model for each data set;

determining a maximum value of the Euclidian distances for the plurality of data sets;

determining a damage index (DI) based on the Euclidian distances and the maximum value of the Euclidian distances; and determining the presence of damage in the structure at least partially according to DI and the Mahalanobis distances;

wherein determining the presence of damage in the structure is based on whether DI exceeds a first predetermined threshold value, and whether a change in a Mahalanobis distance from one or more previously determined Mahalanobis distances exceeds a second predetermined threshold value.

10. The method of claim 9, wherein the third mean value is the second mean value.

11. The method of claim 9, wherein the Gaussian Mixture Model further comprises an order number, and the order number is preferably 4 or 6.

12. The method of claim 9, wherein determining the mean of the density function further comprises determining the first mean value at least partially according to a K-means process.

13. A method of detecting damage in a structure, comprising:

for a structural health monitoring system having sensing elements coupled to the structure, collecting data from the sensing elements, the data corresponding to stress waves in the structure detected by the sensing elements;

determining energies of the stress waves from the collected data;

comparing the energies of the stress waves to previously determined energies;

determining, based on results of the comparison, those energies of the stress waves that exceed the corresponding previously determined energies;

determining first energy dispersion rates of those energies that exceed the corresponding previously determined energies; and determining a damage progression parameter at least partially according to the first energy dispersion rates.

14. The method of claim 13, further comprising:

comparing the damage progression parameter to a predetermined threshold value; and determining the presence of damage when the damage progression parameter exceeds the predetermined threshold value.

15. The method of claim 13, further comprising:

determining times at which the energies of the stress waves that exceed the corresponding previously determined energies occur; and determining the damage progression parameter at least partially according to the determined times.

16. The method of claim 13, wherein if the results of the comparison indicate that no energies of the stress waves exceed the corresponding previously determined energies:

determining those energies of the previously determined energies that most exceed the corresponding energies of the stress waves;

determining second energy dispersion rates of the corresponding energies of the stress waves; and determining the damage progression parameter at least partially according to the second energy dispersion rates.

* * * * *